United States Patent
Wallace

(10) Patent No.: US 8,274,013 B2
(45) Date of Patent: Sep. 25, 2012

(54) SYSTEM FOR TRACKING AND ANALYZING WELDING ACTIVITY

(75) Inventor: Matthew Wayne Wallace, Farmington, CT (US)

(73) Assignee: Lincoln Global, Inc., City of Industry, CA (US)

(*) Notice: Subject to any disclaimer, the term of this patent is extended or adjusted under 35 U.S.C. 154(b) by 390 days.

(21) Appl. No.: 12/719,053

(22) Filed: Mar. 8, 2010

(65) Prior Publication Data

US 2010/0224610 A1 Sep. 9, 2010

Related U.S. Application Data

(60) Provisional application No. 61/158,578, filed on Mar. 9, 2009.

(51) Int. Cl.
*B23K 9/06* (2006.01)

(52) U.S. Cl. .......... 219/137 R; 219/136; 219/124.34

(58) Field of Classification Search .......... 219/109–110, 219/124.34, 137 R, 136, 130.01, 130.31, 219/130.32, 130.33; 434/234
See application file for complete search history.

(56) References Cited

U.S. PATENT DOCUMENTS

| | | |
|---|---|---|
| 3,866,011 A | 2/1975 | Cole et al. |
| 3,867,769 A | 2/1975 | Schow et al. |
| 3,904,845 A | 9/1975 | Minkiewicz et al. |
| 4,041,615 A | 8/1977 | Whitehill |
| 4,124,944 A | 11/1978 | Blair |
| 4,132,014 A | 1/1979 | Schow |
| 4,452,589 A | 6/1984 | Denison |
| 4,611,111 A | 9/1986 | Baheti et al. |
| 4,677,277 A | 6/1987 | Cook et al. |
| 4,680,014 A | 7/1987 | Paton et al. |
| 4,689,021 A | 8/1987 | Vasiliev et al. |
| 4,716,273 A | 12/1987 | Paton et al. |
| 4,867,685 A | 9/1989 | Brush et al. |
| 4,897,521 A | 1/1990 | Burr |
| 4,907,973 A | 3/1990 | Hon |
| 4,931,018 A | 6/1990 | Herbst et al. |
| 5,320,538 A | 6/1994 | Baum |

(Continued)

FOREIGN PATENT DOCUMENTS

CN 101419755 A1 4/2009

(Continued)

OTHER PUBLICATIONS

Yizhong Wang, Younghua Chen, Zhongliang Nan, Yong Hu, Study on Welder Training by Means of Haptic Guidance and Virtual Reality for Arc Welding, 2006 IEEE International Conference on Robotics and Biomimetrics, pp. 954-958, ROBIO 2006 ISBN-10:1424405718, Dec. 17-20, 2006, Kunming, China.

(Continued)

*Primary Examiner* — Dung A. Le
(74) *Attorney, Agent, or Firm* — Hahn Loeser & Parks LLP

(57) ABSTRACT

A system and a method for tracking and analyzing welding activity. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

20 Claims, 6 Drawing Sheets

U.S. PATENT DOCUMENTS

| | | | |
|---|---|---|---|
| 5,823,785 | A | 10/1998 | Matherne, Jr. |
| 6,155,928 | A | 12/2000 | Burdick |
| 6,506,997 | B2 | 1/2003 | Matsuyama |
| 6,583,386 | B1 * | 6/2003 | Ivkovich ............. 219/130.01 |
| 6,647,288 | B2 | 11/2003 | Madill et al. |
| 6,750,428 | B2 | 6/2004 | Okamoto et al. |
| 7,021,937 | B2 | 4/2006 | Simpson et al. |
| 7,414,595 | B1 | 8/2008 | Muffler |
| 7,465,230 | B2 | 12/2008 | LeMay et al. |
| 2002/0032553 | A1 | 3/2002 | Simpson et al. |
| 2003/0172032 | A1 | 9/2003 | Choquet |
| 2005/0275913 | A1 | 12/2005 | Vesely et al. |
| 2005/0275914 | A1 | 12/2005 | Vesely et al. |
| 2006/0136183 | A1 | 6/2006 | Choquet |
| 2006/0258447 | A1 | 11/2006 | Baszucki et al. |
| 2007/0198117 | A1 | 8/2007 | Wajihuddin |
| 2008/0038702 | A1 | 2/2008 | Choquet |
| 2008/0233550 | A1 | 9/2008 | Solomon |
| 2009/0173726 | A1 | 7/2009 | Davidson et al. |
| 2009/0298024 | A1 | 12/2009 | Batzler et al. |
| 2010/0133247 | A1 * | 6/2010 | Mazumder et al. ...... 219/121.83 |

FOREIGN PATENT DOCUMENTS

| | | |
|---|---|---|
| CN | 101587659 A | 11/2009 |
| ES | 2274736 A1 | 5/2007 |
| KR | 20090010693 A | 1/2009 |
| WO | 2006034571 A1 | 4/2006 |

OTHER PUBLICATIONS

Nancy C. Porter, J. Allan Cote, Timothy D. Gifford, Wim Lan, Virtual Reality Welder Training, Paper No. 2005-P19, 2005, pp. 1-14.

Asciencetutor.Com, A Division of Advanced Science and Automation Corp., VWL (Virtual Welding Lab), 2007, 2 pages.

Edison Welding Institute, E-Weld Predictor, 3 pages, 2008, Columbus, OH.

Tim Heston, Virtually welding, The Fabricator, Mar. 2008, 4 pages, FMA Communications Inc., Rockford, IL, www.thefabricator.com.

NSRP ASE, Low-Cost Virtual Reality Welder Training System, 2008, 1 page.

Steven White, Mores Prachyabrued, Dhruva Baghi, Amit Aglawe, Dirk Reiners, Christoph Borst, Terry Chambers, Virtual Welder Trainer, IEEE Virtual Reality 2009, p. 303.

Nancy Porter, J. Allan Cote, Timothy Gifford, Virtual Reality Welder Training, CRP Cooperative Research Program, Summary Report SR 0512, Jul. 2005, 4 pages.

Weld Into the Future, Eduwelding+, Training Activities with arc+ simulator, 2005, 4 pages.

Claude Choquet, ARC+: Today's Virtual Reality Solution for Welders, 123 Certification Inc.,Montreal, Quebec, CA, May 2008, 6 pages.

Laurent Da Dalto, Dominique Steib, Daniel Mellet-d'Huart, Olivier Balet, CS WAVE A Virtual learning tool for the welding motion, http://wave,c-s.fr, Mar. 14, 2008, 10 pages.

CS WAVE, The Virtual Welding Trainer, 6 pages, 2007.

Fronius—virtual welding, www.fh-joanneum.at/ca/cn/yly/?lan=en, 2 pages, May 12, 2008.

Fronius, ARS Electronica, 2 pages, May 18, 1997.

P/NA.3 Process Modelling and Optimization, www.natech-inc.com/pna3/index.html, 11 pages, Jun. 4, 2008.

"RV-Sold" Welding Simulator Technical and Functional Features, SIMFOR, pp. 1-20, date unknown.

Juan Vicente Rosell, RV-Sold: Simulador virtual para la formacion de soldadores, Deformacion Metalica, Es. vol. 34, No. 301, 14 pages, Jan. 1, 2008.

Kenneth Fast, Timothy Gifford, Robert Yancy, Virtual Training for Welding, 3rd IEEE and ACM International symposium on Mixed and Augmented Reality (ISMAR 2004), 2 pages, 2004.

D. Mavrikios, V. Karabatsou, D. Fragos, G. Chryssolouris, A prototype virtual reality-0cased demonstrator for immersive and interactive simulation of welding processes, International Journal of Computer Integrated Manufacturing, 294-301, 2006.

PCT/IB2009/00605 International Search Report.

PCT/IB2009/00605 Written Opinion.

U.S. Appl. No. 29/399,980, filed Jul. 10, 2009, issued May 11, 2010 as D615,573.

U.S. Appl. No. 29/339,979, filed Jul. 10, 2009, issued Apr. 20, 2010 as D614,217.

U.S. Appl. No. 29/339,978, filed Jul. 10, 2009.

U.S. Appl. No. 12/504,870, filed Jul. 17, 2009 claiming priority to U.S. Appl. No. 61/090,794.

U.S. Appl. No. 12/501,263 filed Jul. 10, 2009 claiming priority to U.S. Appl. No. 61/090,794.

U.S. Appl. No. 12/501,257, filed Jul. 10, 2009 claiming priority to U.S. Appl. No. 61/090,764.

* cited by examiner

SYSTEM FOR TRACKING AND ANALYZING WELDING ACTIVITY

This U.S. patent application claims priority to and the benefit of U.S. provisional patent application Ser. No. 61/158,578 which was filed on Mar. 9, 2009, and which is incorporated herein by reference in its entirety.

TECHNICAL FIELD

Certain embodiments of the present invention pertain to systems for tracking and analyzing welding activity, and more particularly, to systems that capture weld data in real time (or near real time) for analysis and review. Additionally, the embodiments of the present invention provide a system for marking portions of a welded article by indicating possible discontinuities or flaws within the weld joint.

BACKGROUND

In many applications, ascertaining the quality of weld joints is critical to the use and operation of a machine or structure incorporating a welded article. In some instances, x-raying or other nondestructive testing is needed to identify potential flaws within one or more welded joints. However, non-destructive testing can be cumbersome to use, and typically lags the welding process until the inspector arrives to complete the testing. Additionally, it may not be effective for use with all weld joint configurations. Moreover, non-destructive testing does not provide any information about how the weld was completed. In welding applications where identifying waste is vital to producing cost effective parts, non-destructive testing provides no insight into problems like overfill.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

The embodiments of the present invention pertain to a system for tracking and analyzing welding activity. The system may be used in conjunction with a welding power supply and includes a sensor array and logic processor-based technology that captures performance data (dynamic spatial properties) as the welder performs various welding activities. The system functions to evaluate the data via an analysis engine for determining weld quality in real time (or near real time). The system also functions to store and replay data for review at a time subsequent to the welding activity thereby allowing other users of the system to review the performance activity of the welding process.

These and other novel features of the subject matter of the present application, as well as details of illustrated embodiments thereof, will be more fully understood from the following description and drawings.

DETAILED DESCRIPTION

Figure 1:
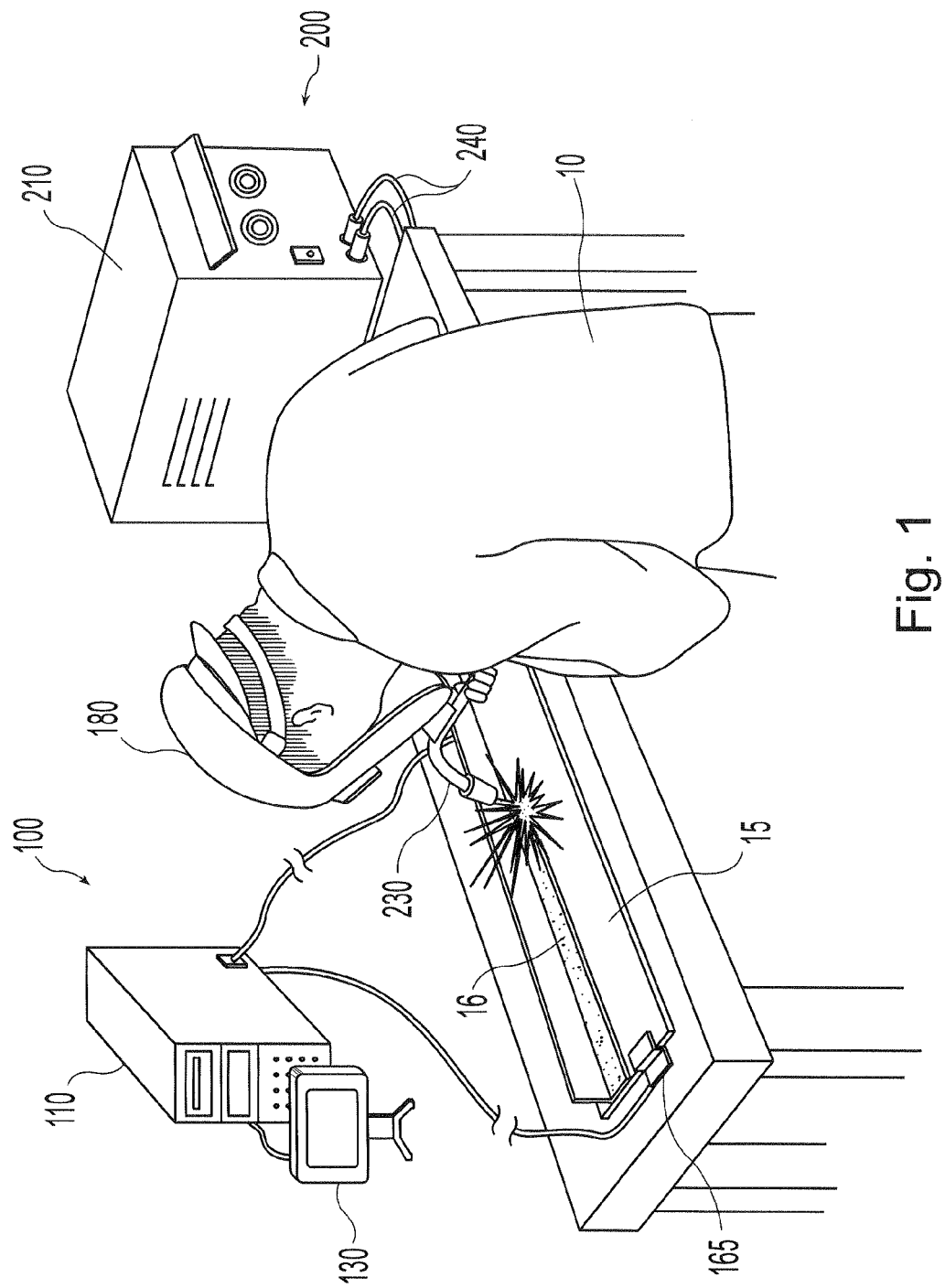
FIG. 1 is a perspective view of a welder using an embodiment of a system for tracking and analyzing welding activity.
Figure 2:
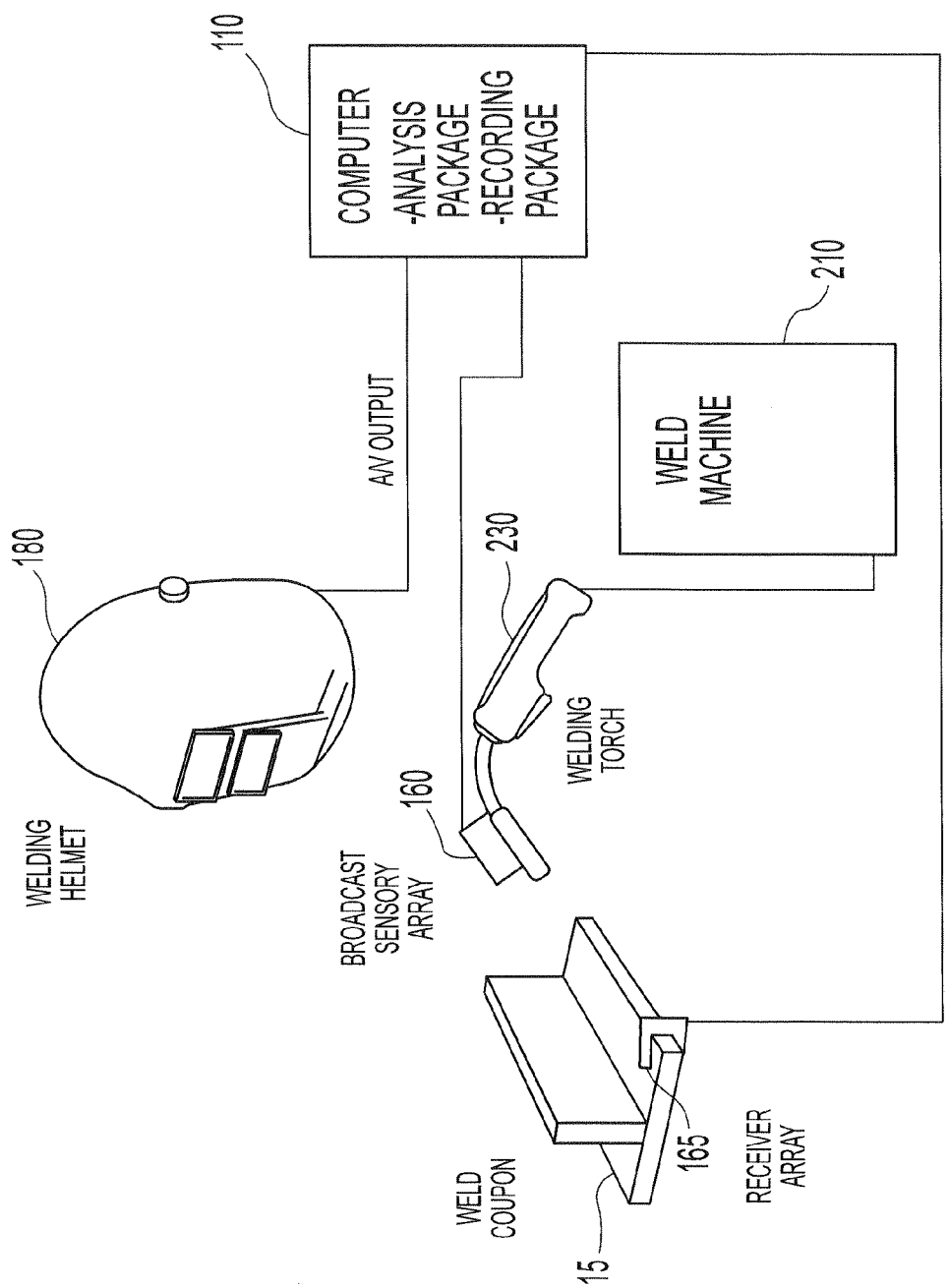
FIG. 2 is a schematic representation of an embodiment of the system of FIG. 1 for tracking and analyzing welding activity.
Figure 3:
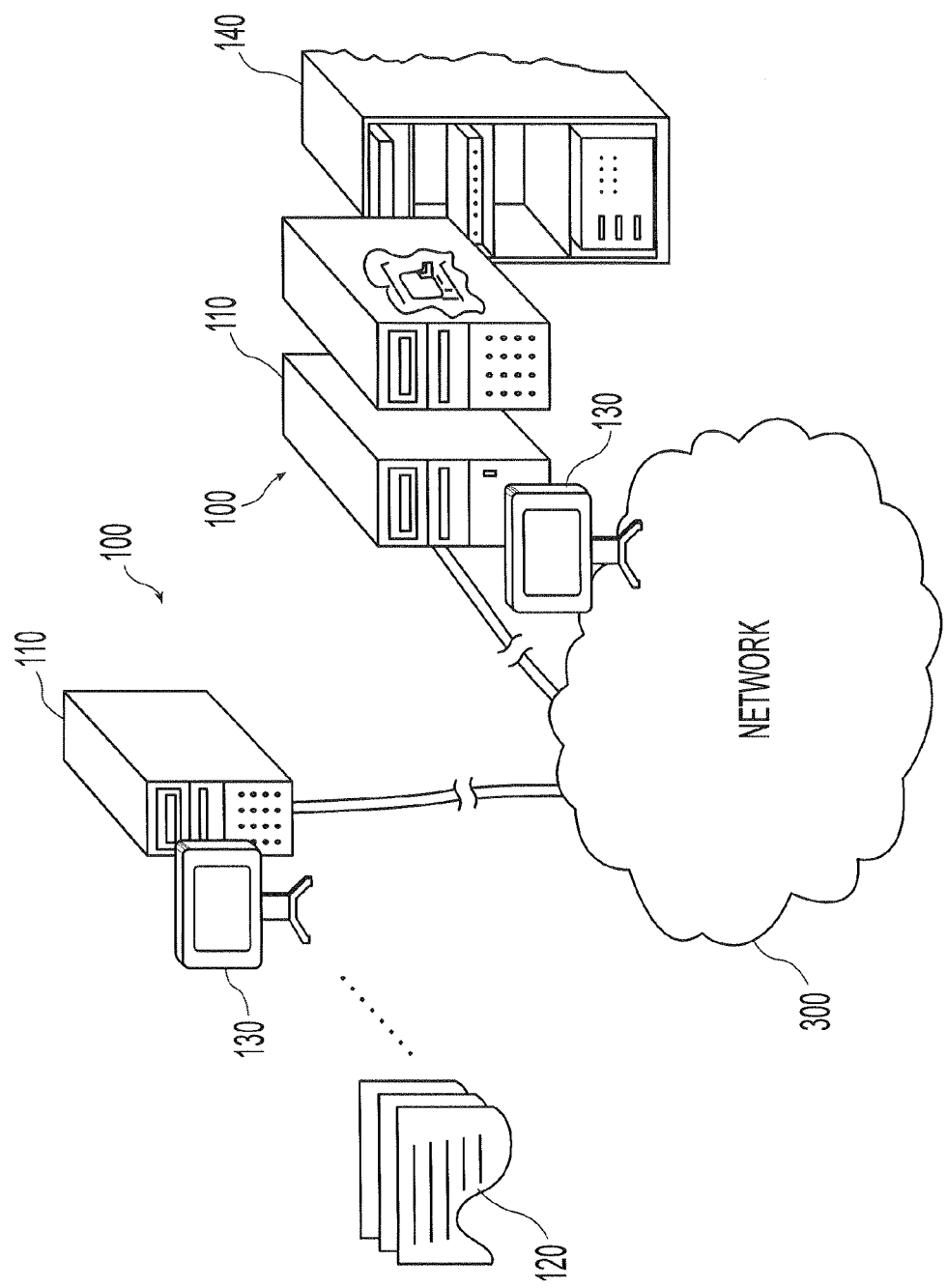
FIG. 3 is a schematic representation of an embodiment of the hardware and software of the system of FIGS. 1-2 for tracking and analyzing welding activity.
Figure 4:
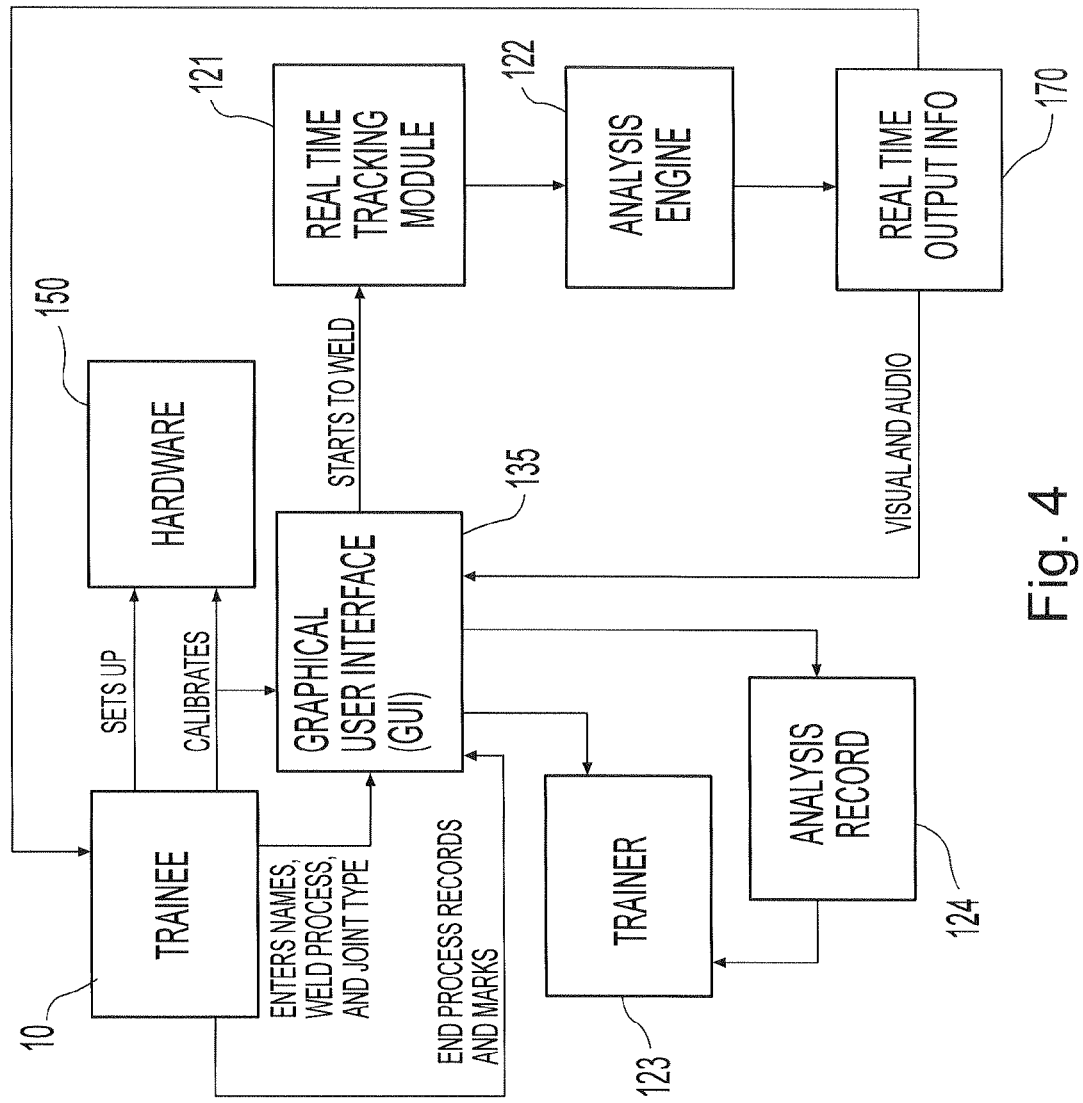
FIG. 4 is a flow diagram of an embodiment of the system of FIGS. 1-3 for tracking and analyzing welding activity.
Figure 5:
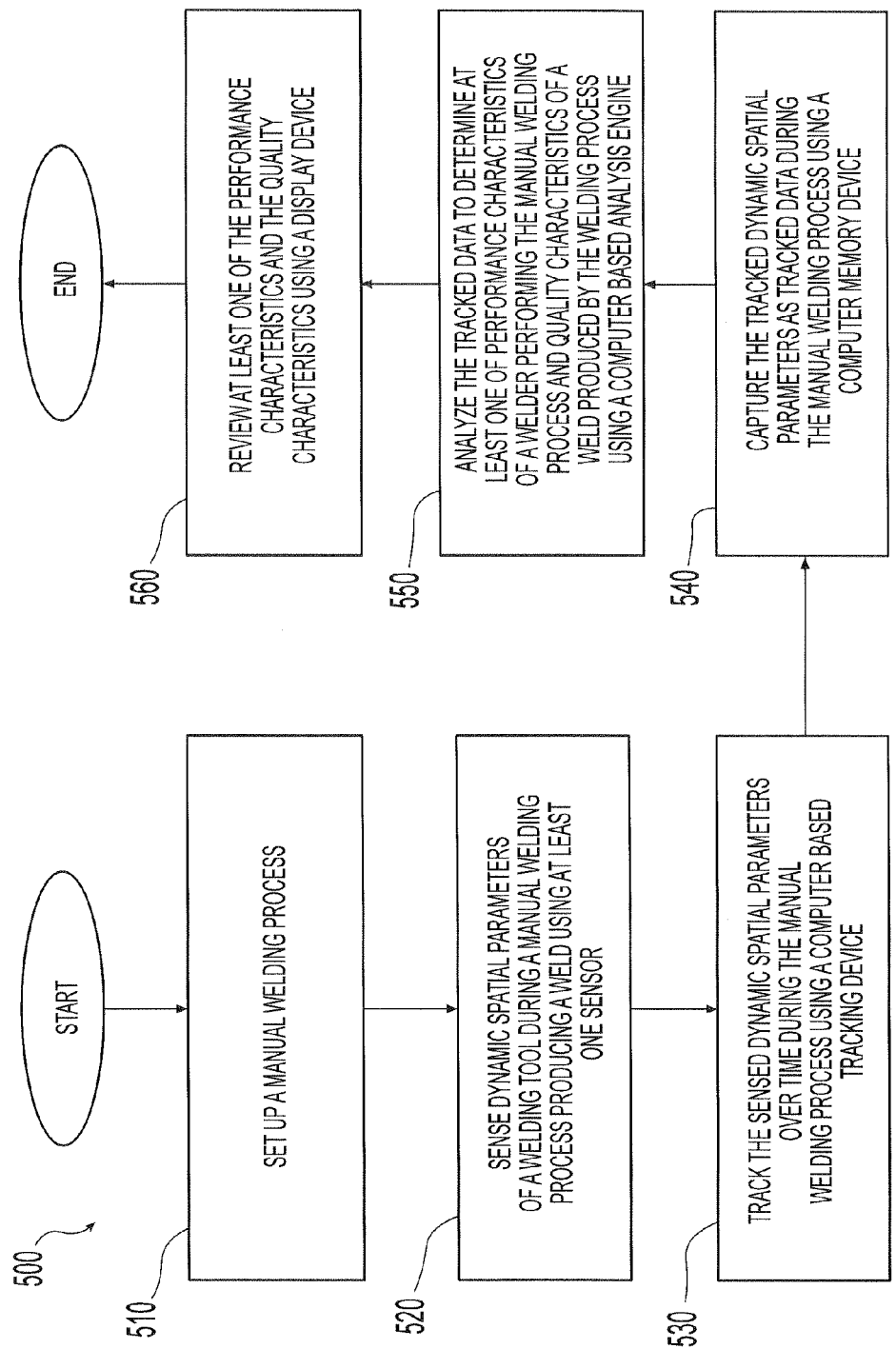
FIG. 5 is a flowchart of an embodiment of a method for tracking and analyzing welding activity using the system of FIGS. 1-4.

FIG. 1 is a perspective view of a welder 10 using an embodiment of a system 100 for tracking and analyzing welding activity while performing a welding process with a welding system 200. FIG. 2 is a schematic representation of an embodiment of the system 100 of FIG. 1 for tracking and analyzing welding activity. FIG. 3 is a schematic representation of an embodiment of the hardware 110, 130 and software 120 of the system 100 of FIGS. 1-2 for tracking and analyzing welding activity. FIG. 4 is a flow diagram of an embodiment of the system 100 of FIGS. 1-3 for tracking and analyzing welding activity. FIG. 5 is a flowchart of an embodiment of a method 500 for tracking and analyzing welding activity using the system 100 of FIGS. 1-4.

Referring again to the drawings wherein the showings are for purposes of illustrating embodiments of the invention only and not for purposes of limiting the same, FIG. 1 shows a system 100 for tracking and analyzing manual processes requiring the dexterity of a human end user 10. In particular, system 100 functions to capture performance data related to the use and handling of tools (e.g., welding tools). In one embodiment, the system 100 is used to track and analyze welding activity, which may be a manual welding process in any of its forms including but not limited to: arc welding, laser welding, brazing, soldering, oxyacetylene and gas welding, and the like. For illustrative purposes, the embodiments of the present invention will be described in the context of arc welding. However, persons of ordinary skill in the art will understand its application to other manual processes. In accordance with alternative embodiments of the present invention, the manual welder 10 may be replaced with a robotic welder. As such, the performance of the robotic welder and resultant weld quality may be determined in a similar manner.

In one embodiment, the system 100 tracks movement or motion (i.e., position and orientation over time) of a welding tool 230, which may be, for example, an electrode holder or a welding torch. Accordingly, the system 100 is used in conjunction with a welding system 200 including a welding power supply 210, a welding torch 230, and welding cables 240, along with other welding equipment and accessories. As a welder 10, i.e. end user 10, performs welding activity in accordance with a welding process, the system 100 functions to capture performance data from real world welding activity as sensed by sensors 160, 165 (see FIG. 2) which are discussed in more detail later herein.

In accordance with an embodiment of the present invention, the system 100 for tracking and analyzing welding activity includes the capability to automatically sense dynamic spatial properties (e.g., positions, orientations, and movements) of a welding tool 230 during a manual welding process producing a weld 16 (e.g., a weld joint). The system 100 further includes the capability to automatically track the sensed dynamic spatial properties of the welding tool 230 over time and automatically capture (e.g., electronically capture) the tracked dynamic spatial properties of the welding tool 230 during the manual welding process.

The system 100 also includes the capability to automatically analyze the tracked data to determine performance characteristics of a welder 10 performing the manual welding process and quality characteristics of a weld 16 produced by the welding process. The system 100 allows for the performance characteristics of the welder 10 and the quality characteristics of the weld to be reviewed. The performance characteristics of a welder 10 may include, for example, a weld joint trajectory, a travel speed of the welding tool 230, welding tool pitch and roll angles, an electrode distance to a center weld joint, an electrode trajectory, and a weld time. The quality characteristics of a weld produced by the welding process may include, for example, discontinuities and flaws within certain regions of a weld produced by the welding process.

The system 100 further allows a user (e.g., a welder 10) to locally interact with the system 100. In accordance with another embodiment of the present invention, the system 100 allows a remotely located user to remotely interact with the system 100. In either scenario, the system 100 may automatically authorize access to a user of the system 100, assuming such authorization is warranted.

In accordance with an embodiment of the present invention, the system 100 for tracking and analyzing welding activity includes a processor based computing device 110 configured to track and analyze dynamic spatial properties (e.g., positions, orientations, and movements) of a welding tool 230 over time during a manual welding process producing a weld 16. The system 100 further includes at least one sensor array 160, 165 operatively interfacing to the processor based computing device 110 (wired or wirelessly) and configured to sense the dynamic spatial properties of a welding tool 230 during a manual welding process producing a weld 16. The system 100 also includes at least one user interface operatively interfacing to the processor based computing device 110. The user interface may include a graphical user interface 135 and/or a display device (e.g., a display 130 or a welding display helmet 180 where a display is integrated into a welding helmet as illustrated in FIG. 2). The system 100 may further include a network interface configured to interface the processor based computing device 110 to a communication network 300 (e.g., the internet).

In accordance with an embodiment of the present invention, a method 500 (see FIG. 5) for tracking and analyzing welding activity includes, in step 510, setting up a manual welding process, and, in step 520, sensing dynamic spatial properties (e.g., positions, orientations, and movements) of a welding tool 230 during a manual welding process producing a weld using at least one sensor (e.g., sensor arrays 160 and 165). In step 530, the method includes tracking the sensed dynamic spatial properties over time during the manual welding process using a real time tracking module 121 (see FIG. 4). The method also includes, in step 540, capturing the tracked dynamic spatial properties as tracked data during the manual welding process using a computer based (e.g., electronic) memory device (e.g., a portion of the hardware 150 and software 120 of the processor based computing device 110). The method further includes, in step 550, analyzing the tracked data to determine performance characteristics of a welder 10 performing the manual welding process and/or quality characteristics of a weld produced by the welding process using a computer based analysis engine 122. In step 560, at least one of the performance characteristics and the quality characteristics are reviewed using a display device (e.g., display device 130). Alternatively, a visualization module or a testing module may be used in place of the display device 130, as are well known in the art.

The method 500 may initially include selecting welding set up parameters for the welding process via a user interface 135 as part of step 510. The method may also include outputting the performance characteristics of the welder 10 and/or the quality characteristics of a weld to a remote location and remotely viewing the performance characteristics and/or the quality characteristics via a communication network 300 (see FIG. 3).

The system 100 for tracking and analyzing welding activity comprises hardware and software components, in accordance with an embodiment of the present invention. In one embodiment, the system 100 incorporates electronic hardware. More specifically, system 100 may be constructed, at least in part, from electronic hardware 150 (see FIG. 4) of the processor based computing device 110 operable to execute programmed algorithms, also referred to herein as software 120 or a computer program product. The processor based computing device 110 may employ one or more logic processors capable of being programmed, an example of which may include one or more microprocessors. However, other types of programmable circuitry may be used without departing from the intended scope of coverage of the embodiments of the present invention. In one embodiment, the processor based computing device 110 is operatively disposed as a microcomputer in any of various configurations including but not limited to: a laptop computer, a desktop computer, a work station, a server or the like. Alternatively, mini-computers or main frame computers may serve as the platform for implementing the system 100 for tracking and analyzing welding activity. Moreover, handheld or mobile processor based computing devices may be used to execute programmable code for tracking and analyzing performance data.

Other embodiments are contemplated wherein the system 100 is incorporated into the welding system 200. More specifically, the components comprising the system 100 may be integrated into the welding power supply 210 and/or weld torch 230. For example, the processor based computing device 110 may be received internal to the housing of the welding power supply 210 and may share a common power supply with other systems located therein. Additionally, sensors 160, 165, used to sense the weld torch 230 dynamic spatial properties, may be integrated into the weld torch handle.

The system 100 may communicate with and be used in conjunction with other similarly or dissimilarly constructed systems. Input to and output from the system 100, termed I/O, may be facilitated by networking hardware and software including wireless as well as hard wired (directly connected) network interface devices. Communication to and from the system 100 may be accomplished remotely as through a network 300 (see FIG. 3), such as, for example, a wide area network (WAN) or the Internet, or through a local area network (LAN) via network hubs, repeaters, or by any means chosen with sound engineering judgment. In this manner, information may be transmitted between systems as is useful for analyzing, and/or re-constructing and displaying performance and quality data.

In one embodiment, remote communications are used to provide virtual instruction by personnel, i.e. remote or offsite users, not located at the welding site. Reconstruction of the welding process is accomplished via networking. Data representing a particular weld may be sent to another similar or dissimilar system 100 capable of displaying the weld data (see FIG. 3). It should be noted that the transmitted data is sufficiently detailed for allowing remote user(s) to analyze the welder's performance and the resultant weld quality. Data sent to a remote system 100 may be used to generate a virtual welding environment thereby recreating the welding process as viewed by offsite users as discussed later herein. Still, any way of communicating performance data to another entity remotely located from the welding site may be used without departing from the intended scope of coverage of the embodiments of the subject invention.

The processor based computing device 110 further includes support circuitry including electronic memory devices, along with other peripheral support circuitry that facilitate operation of the one or more logic processor(s), in accordance with an embodiment of the present invention. Additionally, the processor based computing device 110 may include data storage, examples of which include hard disk drives, optical storage devices and/or flash memory for the storage and retrieval of data. Still any type of support circuitry may be used with the one or more logic processors as chosen with sound engineering judgment. Accordingly, the processor based computing device 110 may be programmable and operable to execute coded instructions in a high or low level programming language. It should be noted that any form of programming or type of programming language may be used to code algorithms as executed by the system 100.

With reference now to FIGS. 1-4, the system 100 is accessible by the end user 10 via a display screen 130 operatively connected to the processor based computing device 110. Software 120 installed onto the system 100 directs the end user's 10 interaction with the system 100 by displaying instructions and/or menu options on, for example, the display screen 130 via one or more graphical user interfaces (GUI) 135. Interaction with the system 100 includes functions relating to, for example: part set up (weld joint set up), welding activity analysis, weld activity playback, real time tracking, as well as administrative activity for managing the captured data. Still other functions may be chosen as are appropriate for use with the embodiments of the present invention. System navigation screens, i.e. menu screens, may be included to assist the end user 10 in traversing through the system functions. It is noted that as the system 100 is used for training and analysis, security may be incorporated into the GUI(s) 135 that allow restricted access to various groups of end users 10. Password security, biometrics, work card arrangement or other security measures may be used to ensure that system access is given only to authorized users as determined by an administrator or administrative user. It will be appreciated that the end user 10 may be the same or a different person than that of the administrative user.

In one embodiment, the system 100 functions to capture performance data of the end user 10 for manual activity as related to the use of tools or hand held devices. In the accompanying figures, welding, and more specifically, arc welding is illustrated as performed by the end user 10 on a weldment 15 (e.g., a weld coupon). The welding activity is recorded by the system 100 in real time or near-real time for tracking and analysis purposes mentioned above by a real time tracking module 121 and an analysis module 122, respectively (see FIG. 4). By recorded it is meant that the system 10 captures data related to a particular welding process for determining the quality of the weld joint or weld joints. The types of performance data that may be captured include, but are not limited to, for example: weld joint configuration or weld joint trajectory, weld speed, welding torch pitch and roll angles, electrode distance to the center weld joint, wire feed speed, electrode trajectory, weld time, and time and date data. Other types of data may also be captured and/or entered into the system 100 including: weldment materials, electrode materials, user name, project ID number, and the like. Still, any type and quantity of information may be captured and/or entered into the system 100 as is suitable for tracking, analyzing and managing weld performance data. In this manner, detailed information about how the welding process for a particular weld joint was performed may be captured and reconstructed for review and analysis in an analysis record 124.

The data captured and entered into the system 100 is used to determine the quality of the real world weld joint. Persons of ordinary skill in the art will understand that a weld joint may be analyzed by various processes including destructive and non-destructive methods, examples of which include sawing/cutting or x-raying of the weld joint respectively. In prior art methods such as these, trained or experienced weld personnel can determine the quality of a weld performed on a weld joint. Of course, destructive testing renders the weldment unusable and thus can only be used for a sampling or a subset of welded parts. While non-destructive testing, like x-raying, do not destroy the welded article, these methods can be cumbersome to use and the equipment expensive to purchase. Moreover, some weld joints cannot be appropriately x-rayed, i.e. completely or thoroughly x-rayed. By way of contrast, system 100 captures performance data during the welding process that can be used to determine the quality of the welded joint. More specifically, system 100 is used to identify potential discontinuities and flaws within specific regions of a weld joint. The captured data may be analyzed by an experienced welder or trained professional (e.g., a trainer 123, see FIG. 4), or in an alternative by the system 100 using the analysis module 122 for identifying areas within the weld joint that may be flawed. In one example, torch position and orientation along with travel speed and other critical parameters are analyzed as a whole to predict which areas along the weld joint, if any, are deficient. It will be understood that quality is achieved during the welding process when the operator 10 keeps the weld torch 230 within acceptable operational ranges. Accordingly, the performance data may be analyzed against known good parameters for achieving weld quality for a particular weld joint configuration.

Figure 6:
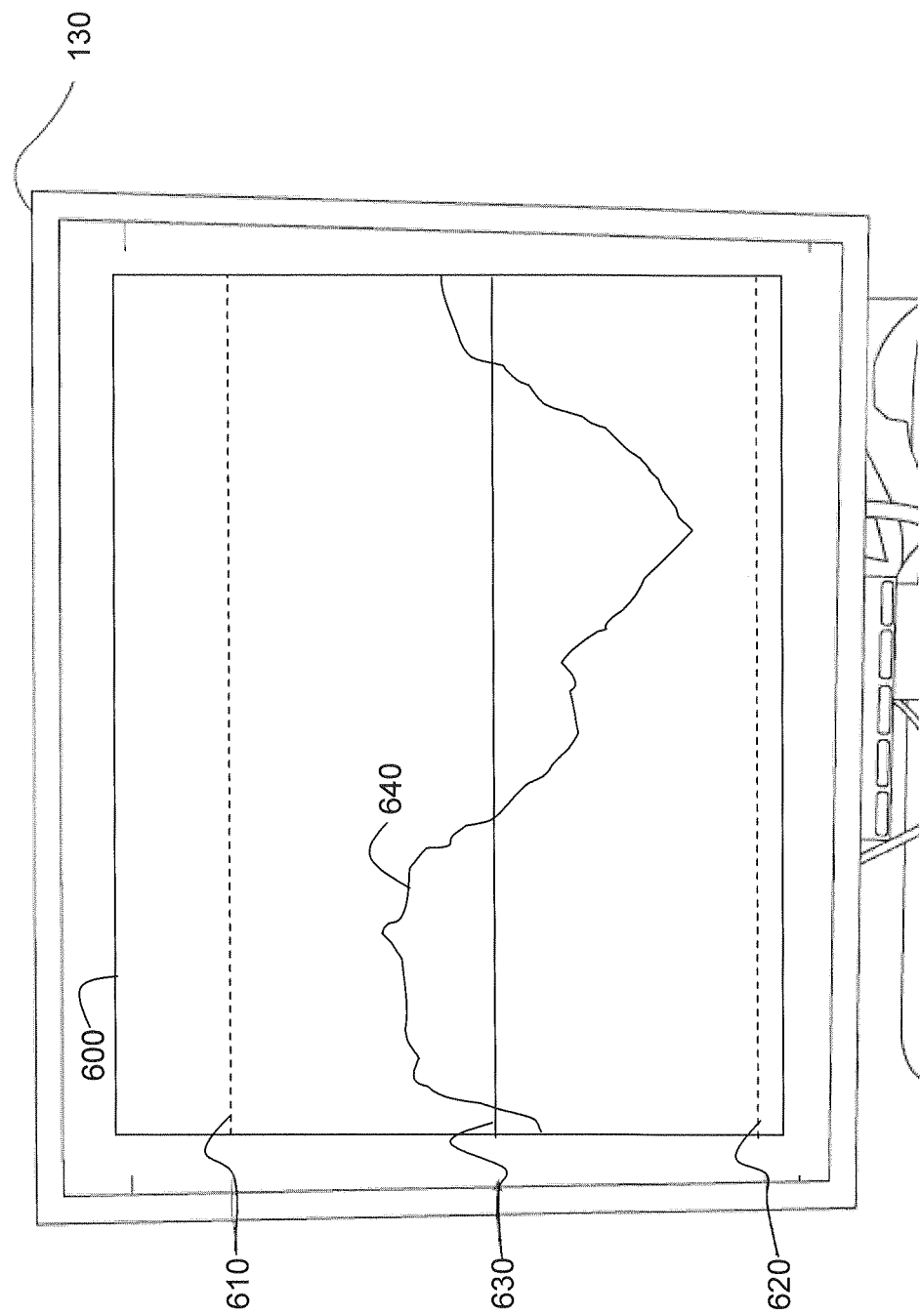
FIG. 6 illustrates an example embodiment of a graph, displayed on a display, showing tracked welding tool pitch angle versus time with respect to an upper pitch angle limit, a lower pitch angle limit, and an ideal pitch angle.

FIG. 6 illustrates an example embodiment of a graph 600, displayed on the display 130, showing tracked welding tool pitch angle 640 versus time with respect to an upper pitch angle limit 610, a lower pitch angle limit 620, and an ideal pitch angle 630. The upper and lower limits 610 and 620 define a range of acceptability between them. Different limits may be predefined for different types of users such as, for example, welding novices, welding experts, and persons at a trade show. The analysis engine 122 may provide a scoring capability, in accordance with an embodiment of the present invention, where a numeric score is provided based on how close to optimum (ideal) a user is for a particular tracked parameter, and depending on the determined level of discontinuities or defects determined to be present in the weld.

Performance data may be stored electronically in a database 140 (see FIG. 3) and managed by a database manager in a manner suitable for indexing and retrieving selected sets or subsets of data. In one embodiment, the data is retrieved and presented to an analyzing user (e.g., a trainer 123) for determining the weld quality of a particular weld joint. The data may be presented in tabular form for analysis by the analyzing user. Pictures, graphs, and or other symbol data may also be presented as is helpful to the analyzing user in determining weld quality. In an alternative embodiment, the performance data may be presented to the analyzing user in a virtual reality setting, whereby the real world welding process is simulated using real world data as captured by the system 100. An example of such a virtual reality setting is discussed in U.S. patent application Ser. No. 12/501,257 filed on Jul. 10, 2009. In this way, the weld joint and corresponding welding process may be reconstructed for review and analysis. Accordingly, the system 100 may be used to archive real data as it relates to a particular welded article. Still, it will be construed that any manner of representing captured data or reconstructing the welding process for the analyzing user may be used as is appropriate for determining weld quality.

In another embodiment, data captured and stored in the database 140 is analyzed by an analyzing module 122 (a.k.a., an analysis engine) of the system 100. The analyzing module 122 may comprise a computer program product executed by the processor based computing device 110. The computer program product may use artificial intelligence. In one particular embodiment, an expert system may be programmed with data derived from a knowledge expert and stored within an inference engine for independently analyzing and identifying flaws within the weld joint. By independently, it is meant that the analyzing module 122 functions independently from the analyzing user to determine weld quality. The expert system may be ruled-based and/or may incorporate fuzzy logic to analyze the weld joint. In this manner, areas along the weld joint may be identified as defective, or potentially defective, and marked for subsequent review by an analyzing user. Determining weld quality and/or problem areas within the weld joint may be accomplished by heuristic methods. As the system 100 analyzes welding processes of the various end users over repeated analyzing cycles, additional knowledge may be gained by the system 100 for determining weld quality.

A neural network or networks may be incorporated into the analysis engine 122 of the system 100 for analyzing data to determine weld quality, weld efficiency and/or weld flaws or problems. Neural networks may comprise software programming that simulates decision making capabilities. In one embodiment, the neural network(s) may process data captured by the system 100 making decisions based on weighted factors. It is noted that the neural network(s) may be trained to recognize problems that may arise from the weld torch position and movement, as well as other critical welding factors. Therefore, as data from the welding process is captured and stored, the system 100 may analyze the data for identifying the quality of the weld joint. Additionally, the system 100 may provide an output device 170 (see FIG. 4) that outputs indications of potential flaws in the weld such as, for example, porosity, weld overfill, and the like.

In capturing performance data, the system 100 incorporates a series of sensors, also referred to as sensor arrays 160, 165 (see FIG. 2). The sensor arrays 160, 165 include emitters and receivers positioned at various locations in proximity to the weldment 15, and more specifically, in proximity to the weld joint 16 for determining the position and orientation of the weld torch 230 in real time (or near real time). In one embodiment, the sensor arrays 160, 165 include acoustical sensor elements. It is noted that the acoustical sensor elements may use waves in the sub-sonic and/or ultra-sonic range. Alternate embodiments are contemplated that use optical sensor elements, infrared sensor elements, laser sensor elements, magnetic sensor elements, or electromagnetic (radio frequency) sensor elements. In this manner, the sensor emitter elements emit waves of energy in any of various forms that are picked up by the sensor receiver elements. To compensate for noise introduced by the welding process, the system 100 may also include bandwidth suppressors, which may be implemented in the form of software and/or electronic circuitry. The bandwidth suppressors are used to condition the sensor signals to penetrate interference caused by the welding arc. Additionally, the system 100 may further incorporate inertial sensors, which may include one or more accelerometers. In this manner, data relating to position, orientation, velocity, and acceleration may be required to ascertain the movements (i.e., motion) of the weld torch 230.

In one embodiment, part of the sensor arrays 160, 165 are received by the weld torch 230. That is to say that a portion of the sensors or sensor elements are affixed with respect to the body of the weld torch 230 (see sensor array 160 of FIG. 2). In other embodiments, sensors and/or sensor elements may be affixed to a portion of the article being welded (see sensor array 165 of FIG. 2). Still any manner of positioning and connecting the sensor elements may be chosen as is appropriate for tracking welding activity.

As an example of sensing and tracking a welding tool 230, in accordance with an embodiment of the present invention, a magnetic sensing capability may be provided. For example, the receiver sensor array 165 may be a magnetic sensor that is mounted on the welding tool 230, and the emitter sensor array 160 may take the form of a magnetic source. The magnetic source 160 may be mounted in a predefined fixed position and orientation with respect to the weldment 15. The magnetic source 160 creates a magnetic field around itself, including the space encompassing the welding tool 230 during use and establishes a 3D spatial frame of reference. The magnetic sensor 165 is provided which is capable of sensing the magnetic field produced by the magnetic source. The magnetic sensor 165 is attached to the welding tool 230 and is operatively connected to the processor based computing device 110 via, for example, a cable, or wirelessly. The magnetic sensor 165 includes an array of three induction coils orthogonally aligned along three spatial directions. The induction coils of the magnetic sensor 165 each measure the strength of the magnetic field in each of the three directions and provide that information to the real time tracking module 121 of the processor based computing device 110. As a result, the system 100 is able to know where the welding tool 230 is in space with respect to the 3D spatial frame of reference established by the magnetic field produced by the magnetic source 160. In accordance with other embodiments of the present invention, two or more magnetic sensors may be mounted on or within the welding tool 230 to provide a more accurate representation of the position and orientation of the welding tool 230, for example. Care is to be taken in establishing the magnetic 3D spatial frame of reference such that the weldment 15, the tool 230, and any other portions of the welding environment do not substantially distort the magnetic field created by the magnetic source 160. As an alternative, such distortions may be corrected for or calibrated out as part of a welding environment set up procedure. Other non-magnetic technologies (e.g., acoustic, optical, electromagnetic, inertial, etc.) may be used, as previously discussed herein, to avoid such distortions, as are well known in the art.

With reference to all of the figures, operation of the system 100 will now be described in accordance with an embodiment of the present invention. The end user 10 activates the system 100 and enters his or her user name via the user interface 135. Once authorized access has been gained, the end user 10 traverses the menu system as prompted by the computer program product 120 via the GUI 135. The system 100 instructs the end user 10 to initiate set up of the welding article 15, which includes entering information about the weldment materials and/or welding process being used. Entering such information may include, for example, selecting a language, entering a user name, selecting a weld coupon type, selecting a welding process and associated axial spray, pulse, or short arc methods, selecting a gas type and flow rate, selecting a type of stick electrode, and selecting a type of flux cored wire.

In one embodiment, the end user enters the starting and ending points of the weld joint 16. This allows the system 100, via the real time tracking module 121, to determine when to start and stop recording the tracked information. Intermediate points are subsequently entered for interpolating the weld joint trajectory as calculated by the system 100. Additionally, sensor emitters and/or receivers 160, 165 are placed proximate to the weld joint at locations suitable for gathering data in a manner consistent with that described herein. After set up is completed, system tracking is initiated and the end user 10 is prompted to begin the welding procedure. As the end user 10 completes the weld, the system 100 gathers performance data including the speed, position and orientation of the weld torch 230 for analysis by the system 100 in determining welder performance characteristics and weld quality characteristics as previously described herein.

In summary, a system and a method for tracking and analyzing welding activity is disclosed. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A system for tracking and analyzing welding activity, said system comprising:
   means for automatically sensing dynamic spatial properties of a welding tool during a welding process producing a weld;
   means for automatically tracking said sensed dynamic spatial properties over time during said welding process;
   means for automatically capturing said tracked dynamic spatial properties as tracked data during said welding process; and
   means for automatically analyzing said tracked data to determine at least one of performance characteristics of a welder performing said welding process and quality characteristics of a weld produced by said welding process.

2. The system of claim 1 further comprising means for reviewing said performance characteristics of a welder performing said welding process.

3. The system of claim 1 further comprising means for reviewing said quality characteristics of a weld produced by said welding process.

4. The system of claim 1 further comprising means for a user to locally interact with said system.

5. The system of claim 1 further comprising means for a user to remotely interact with said system.

6. The system of claim 1 further comprising means for automatically authorizing access to a user of said system.

7. The system of claim 1 wherein said performance characteristics of a welder include at least one of a weld joint trajectory, a travel speed of said welding tool, welding tool pitch and roll angles, an electrode distance to a center weld joint, an electrode trajectory, and a weld time.

8. The system of claim 1 wherein said quality characteristics of a weld produced by said welding process include at least one of discontinuities and flaws within regions of a weld produced by said welding process.

9. A system for tracking and analyzing welding activity, said system comprising:
   at least one sensor array configured to sense dynamic spatial properties of a welding tool during a welding process producing a weld;
   a processor based computing device operatively interfacing to said at least one sensor array and configured to track and analyze said dynamic spatial properties of a welding tool over time during a welding process producing a weld; and
   at least one user interface operatively interfacing to said processor based computing device.

10. The system of claim 9 wherein said at least one user interface includes a graphical user interface.

11. The system of claim 9 wherein said at least one user interface includes a display device.

12. The system of claim 9 further comprising a network interface configured to interface said processor based computing device to an external communication network.

13. The system of claim 9 wherein said at least one sensor array includes at least one of acoustical sensor elements, optical sensor elements, magnetic sensor elements, and electromagnetic sensor elements.

14. A method for tracking and analyzing welding activity, said method comprising:
   sensing dynamic spatial properties of a welding tool during a welding process producing a weld using at least one sensor;
   tracking said sensed dynamic spatial properties over time during said welding process using a real time tracking module;
   capturing said tracked dynamic spatial properties as tracked data during said welding process using a computer based memory device; and
   analyzing said tracked data to determine at least one of performance characteristics of a welder performing said welding process and quality characteristics of a weld produced by said welding process using a computer based analysis engine.

15. The method of claim 14 further comprising outputting said performance characteristics of a welder performing said welding process to at least one of a display device, a visualization module, and a testing module for review.

16. The method of claim 14 further comprising outputting said quality characteristics of a weld produced by said welding process to at least one of a display device, a visualization module, and a testing module for review.

17. The method of claim 14 further comprising selecting welding set up parameters for said welding process via a user interface.

18. The method of claim 14 further comprising remotely reviewing at least one of said performance characteristics of a welder performing said welding process and said quality characteristics of a weld produced by said welding process, via a communication network.

19. The method of claim 14 wherein said performance characteristics of a welder include at least one of a weld joint trajectory, a travel speed of said welding tool, welding tool pitch and roll angles, an electrode distance to a center weld joint, an electrode trajectory, and a weld time.

20. The method of claim 14 wherein said quality characteristics of a weld produced by said welding process include at least one of discontinuities and flaws within regions of a weld produced by said welding process.

* * * * *